United States Patent [19]

Hayashi

[11] Patent Number: 4,728,767
[45] Date of Patent: Mar. 1, 1988

[54] WELDING GUN APPARATUS
[75] Inventor: Kenji Hayashi, Kure, Japan
[73] Assignee: Mazda Motor Corporation, Hiroshima, Japan
[21] Appl. No.: 920,229
[22] Filed: Oct. 17, 1986
[30] Foreign Application Priority Data
  Oct. 18, 1985 [JP] Japan .......................... 60-160578[U]
[51] Int. Cl.[4] .............................................. B23K 11/10
[52] U.S. Cl. .................................... 219/89; 219/86.25
[58] Field of Search .................... 219/86.25, 86.33, 89, 219/90

[56] References Cited
U.S. PATENT DOCUMENTS

| 3,299,247 | 1/1967 | Waltonen | 219/89 |
| 4,410,782 | 10/1983 | Konno et al. | 219/89 |
| 4,504,725 | 3/1985 | Beneteau | 219/86.25 |

FOREIGN PATENT DOCUMENTS

| 58-23492 | 2/1981 | Japan . | |
| 103977 | 6/1983 | Japan | 219/86.33 |

Primary Examiner—E. A. Goldberg
Assistant Examiner—C. M. Sigda
Attorney, Agent, or Firm—Fleit, Jacobson, Cohn & Price

[57] ABSTRACT

A welding gun apparatus for resistance welding including a longitudinal guide track provided on a pair of fixed plates. The longitudinal guide track extends in a substantially vertical direction and is engaged with both the lower end portion of a carriage for holding a movable electrode arm having a movable electrode and the upper end portion of a piston rod by pins. An arciform guide track formed in the carriage is engaged with pins secured to the respective fixed plates. The longitudinal guide track and the arciform guide track forces the movable electrode arm to move upwardly in a substantially vertical direction at a first stage and then upwardly and obliquely when a workpiece is fed from, and a new workpiece is fed into, a welding station. The carriage is moved smoothly between the welding station and a retracted station, and a sliding portion is prevented from being worn.

2 Claims, 3 Drawing Figures

WELDING GUN APPARATUS

BACKGROUND OF THE INVENTION

The present invention relates to a welding gun apparatus for resistance welding, more particularly, to a welding gun apparatus for resistance welding capable of permitting smooth movement of a movable electrode between a welding station and a retracted station.

DESCRIPTION OF PRIOR ART

The welding gun apparatus for resistance welding is generally provided with a fixed electrode at a lower portion thereof and a movable electrode at an upper portion thereof and the welding is carried out by holding a workpiece to be welded by the fixed electrode and the movable electrode therebetween. The welding gun apparatus is preferably constructed so that when the workpiece is set at a welding station, the movable electrode can be moved apart from the fixed electrode a sufficient distance to make it easy to feed the workpiece into and from the welding station and that when the workpiece is to be welded, the movable electrode can be brought close to the fixed electrode substantially vertically to apply electrical current to the workpiece in the substantially vertical direction.

In order to meet the above requirement, Japanese Utility Model Publication No. 23492/1983 and U.S. Pat. No. 4,410,782 propose a welding gun apparatus in which a pair of cam plates holding a fixed electrode arm therebetween are secured on the upper surface of a driving cylinder and in which a movable electrode arm holder holding a movable gun arm is connected with a piston rod extending upwardly from a piston slidable on the inner surface of the driving cylinder by a pin member at the top end thereof and is engaged with a guide groove formed in a reversed U-shape on each cam plate by pin members formed on the both sides thereof. This prior art apparatus makes it possible to move the movable electrode along the single guide groove between the welding station where the work is pressed between the movable electrode and the fixed electrode and the waiting station apart from the welding station. However, there is a problem in the prior art apparatus that unless the curvature of the groove is increased sufficiently, the movable electrode cannot be moved smoothly along the curved guide groove and the pin members of the movable gun arm holder and the inner wall of the guide groove at the curved portion suffer a high degree of wear because of abrasion therebetween.

SUMMARY OF THE INVENTION

It is therefore an object of the present invention to provide a welding gun apparatus for a resistance welding capable of moving the movable electrode smoothly between the welding station and the waiting station.

It is a further object of the present invention to provide a welding gun apparatus having an improved durability.

According to the present invention, the above and other objects can be accomplished by a welding apparatus for resistance welding having fixed electrode means and movable electrode means, wherein a workpiece is welded at a welding station between said fixed electrode means and said movable electrode means, including fixed electrode arm means provided with said fixed electrode, fixed plate means to which said fixed electrode arm means is rigidly secured, driving cylinder means, piston means slidable within said driving cylinder means, piston rod means being attached to said piston means and extending upwardly in a substantially vertical direction, movable electrode arm means provided with said movable electrode means, carriage means for holding said movable electrode arm means connected with the upper end portion of said piston rod means, piston rod movement regulating means for restricting the movement of said piston rod means in the substantially vertical direction, said piston rod movement regulating means being engaged with both said fixed plate means and said piston rod means, and cam means engaged with both said carriage means and said fixed plate means, said cam means forcing said movable electrode arm means to move upwardly in the substantially vertical direction at a first stage and then upwardly and obliquely to locate said movable electrode means at a position apart from said fixed electrode means with a sufficient distance for easily feeding the workpiece into and from the welding station as said piston means is forced upwardly.

According to the aforementioned features of the present invention, since the carriage means for holding the movable electrode arm means is guided by two means, that is, the cam means and the piston rod movement regulating means, the carriage means can be moved smoothly between the welding station and the retracted station and the sliding portion can be prevented from being worn whereby the durability of the welding gun apparatus is improved, as compared with the prior art apparatus in which the carriage means is guided by a single means.

The above and other objects and features of the present invention will be apparent from the following descriptions taking reference to the accompanying drawings.

DESCRIPTION OF THE PREFERRED EMBODIMENT

Figure 1:
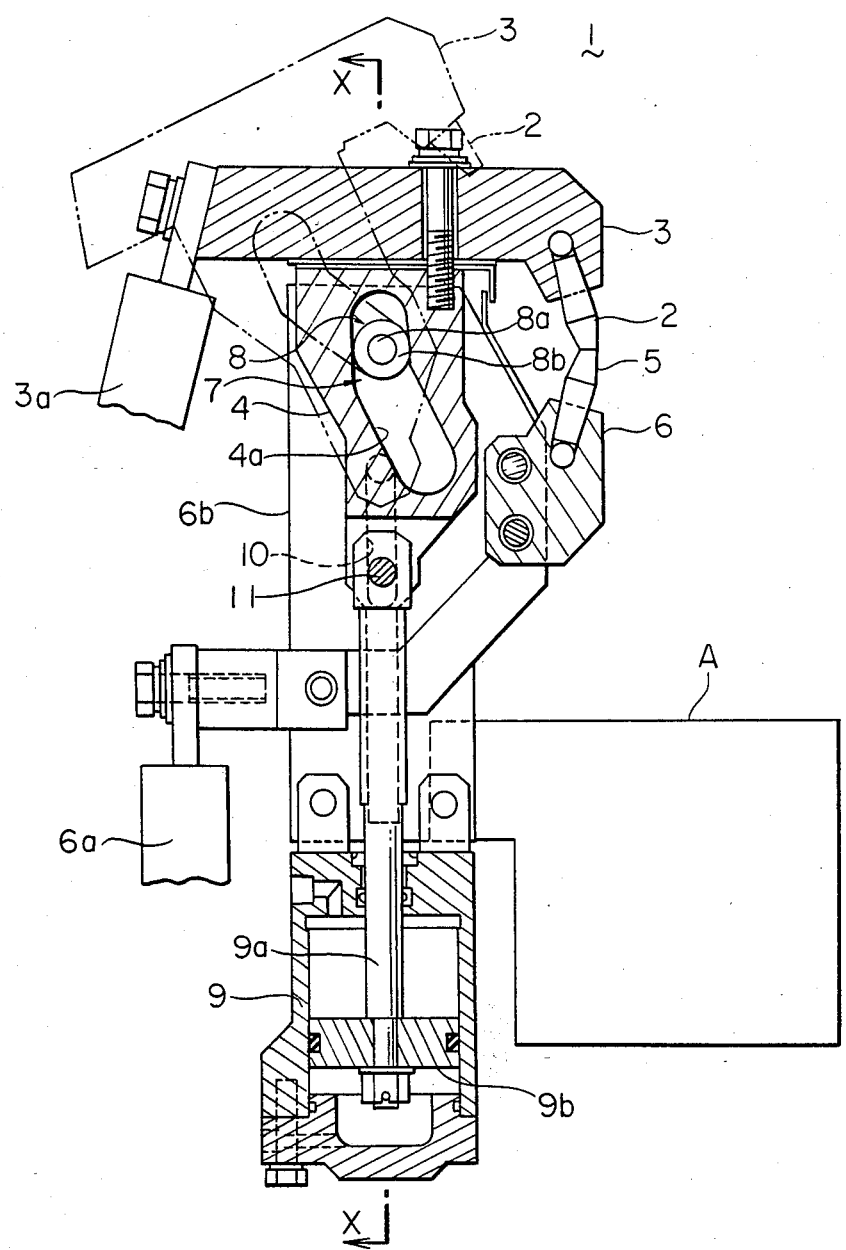
FIG. 1 is a schematic drawing showing a vertical longitudinal sectional view taken at the middle portion of a welding gun apparatus which is an embodiment of the present invention.
Figures 2, 3:
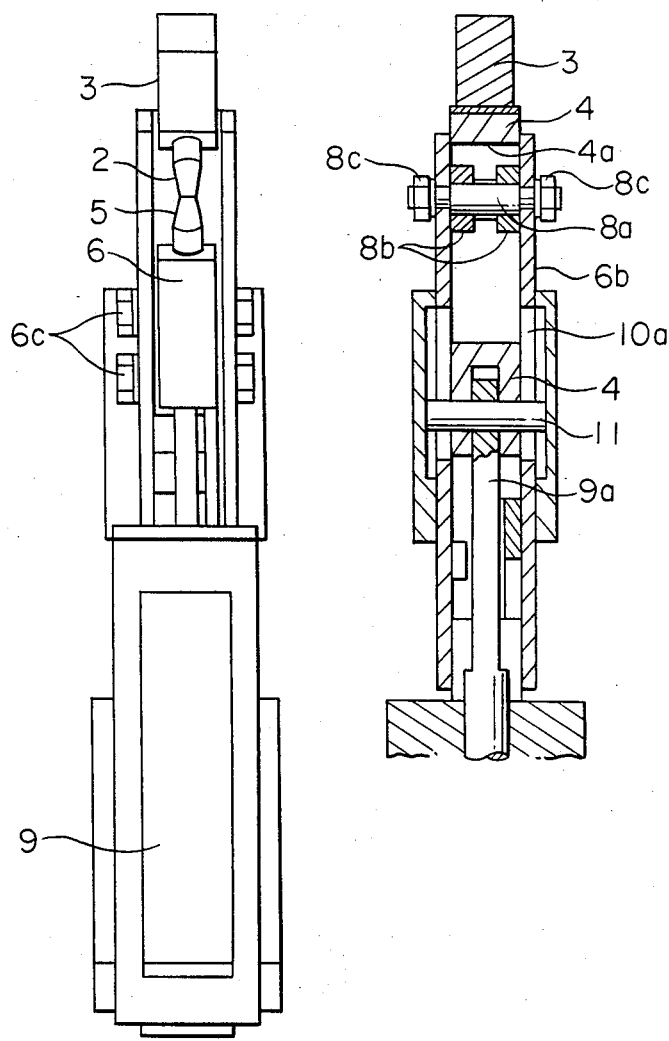
FIG. 2 is a schematic drawing showing a front view of said welding gun apparatus.
FIG. 3 is a schematic drawing showing a cross sectional view taken along line X—X of FIG. 1.

Referring to the drawings, there is shown a welding gun apparatus 1 having a carriage 4 for holding a movable electrode arm 3 provided with a movable electrode 2, a fixed electrode arm 6 provided with a fixed electrode 5 and a pair of fixed plates 6b for holding the fixed electrode arm 6 therebetween. The fixed electrode arm 6 is rigidly secured to the respective fixed plates 6b by nuts 6c. The respective fixed plates 6b are rigidly secured to a work table or machine base A. A guide track 4a is formed in the carriage 4 and a movable electrode retracting means 7 comprising a pin member 8 provided for the respective fixed plates 6b and engaged with the guide track 4a is provided for moving the movable electrode 2 between a welding station and a retracted station. Further, a piston 9b slidable within a driving cylinder 9 is provided, the piston 9b being attached to a piston rod 9a which extends upwardly in a substantially vertical direction, the piston rod 9a at its upper end being connected with the the end portion of the carriage 4 and a piston rod movement regulating means 10 for regulating the movement of the piston rod 9a in a substantially vertical direction is provided on the fixed plates 6b.

The movable electrode arm 3 is connected with a feeder cable 3a and the fixed electrode arm 6 is connected with another feeder cable 6a to feed electrical power thereto.

The guide track 4a is curved in an arcuate form as shown in FIG. 1 and consequently, as the carriage 4 is raised, the movable electrode arm 3 is moved so that the movable electrode 2 is moved to a position spaced a sufficient distance from the fixed electrode 5 for easily feeding a workpiece into and from the welding station.

The pin member 8 is constituted with a roller 8b rotatably mounted around a shaft 8a and secured to the respective fixed plates 6b by nuts 8c.

The piston rod movement regulating means is provided with a pin member 11 rotatably connecting the upper end of the piston rod 9a and the lower end of the carriage 4 and being engaged with a longitudinal track 10a extending in the substantially vertical direction to regulate the movement of the piston rod 9a in the substantially vertical direction. The pin member 8 and the pin member 11 are arranged to be aligned along a common substantially vertical line.

MODE OF OPERATION

When the piston 9b is located at a lower portion in the driving cylinder 9, the carriage 4 is guided by the guide track 4a with which the pin member 8 is engaged and the the longitudinal track 10a with which the pin member 11 is engaged and is forced downwardly by the piston rod 9a. In this state, the movable electrode 2 faces the fixed electrode 5. Then, when the piston 9b in the driving cylinder 9 is forced upwardly, the pin member 11 is forced upwardly along the longtudinal track 10a and, as a result, the piston rod 9a and the lower end of the carriage 4 are forced upwardly. On the other hand, since the carriage is guided by the guide track 4a as well as the longitudinal track 10a, the carriage 4 is forced upwardly in the substantially vertical direction along the lower portion of the guide track 4a at the first stage and then is moved upwardly and leftwardly along the upper portion of the guide track 4a to be forced to rotate to the left and is retracted in the position as shown by a phantom line (two dotted chain line) in FIG. 1. Therefore, the workpiece (not shown) can be easily carried into the welding station and set on the fixed electrode 5 without interference from the movable electrode arm 3.

Once the setting of the workpiece in the welding station has been completed, the carriage 4 and the movable electrode 2 can return to the welding station along a path reverse to that described above as shown by a solid line in FIG. 1 by driving the piston 9b downwardly. Then the welding is started.

The present invention has thus been shown and described with reference to a specific embodiment. However, it should be noted that the present invention is in no way limited to the details of the described arrangements but changes and modifications may be made without departing from the scope of the appended claims.

What is claimed is:

1. A welding gun apparatus for resistance welding, said welding gun apparatus comprising:
    fixed electrode means and movable electrode means for welding a workpiece at a welding station between said fixed electrode means and said movable electrode means,
    fixed electrode arm means provided with said fixed electrode means,
    fixed plate means to which said fixed electrode arm means is rigidly secured,
    driving cylinder means,
    piston means slidable within said driving cylinder means,
    piston rod means attached to said piston means and extending upwardly in a substantially vertical direction,
    movable electrode arm means provided with said movable electrode means,
    carriage means for holding said movable electrode arm means connected with an upper end portion of said piston rod means,
    piston rod movement regulating means for restricting the movement of said piston rod means in the substantially vertical direction, said piston rod movement regulating means including first engaging means provided on said piston rod means and first guide track means for guiding said first engaging means, said first guide track means being formed in said fixed plate means and extending in a substantially vertical direction, and
    cam means including second guide track means formed in said carriage means and second engaging means provided on said fixed plate means, said second guide track means being arcuate and including a vertical track portion at an upper portion and a sloped track portion at a lower portion, said second engaging means being engaged with said second guide track means, the height of said second engaging means being substantially the same as the height of the welding station, said first engaging means and said second engaging means being aligned with a longitudinal axis of said piston rod means, said cam means forcing said movable electrode arm means to move upwardly in the substantially vertical direction at a first stage and then upwardly and obliquely to locate said movable electrode means at a position apart from said fixed electrode means with a sufficient distance for feeding the workpiece into and from the welding station as said piston means is forced upwardly.

2. A welding gun apparatus in accordance with claim 1 in which said fixed plate means comprises a pair of plates holding said fixed electrode arm means therebetween.

* * * * *